Dec. 4, 1928.
T. F. RAINSFORD
1,693,728
MATERIAL FEEDING DEVICE
Filed June 22, 1925   3 Sheets-Sheet 1
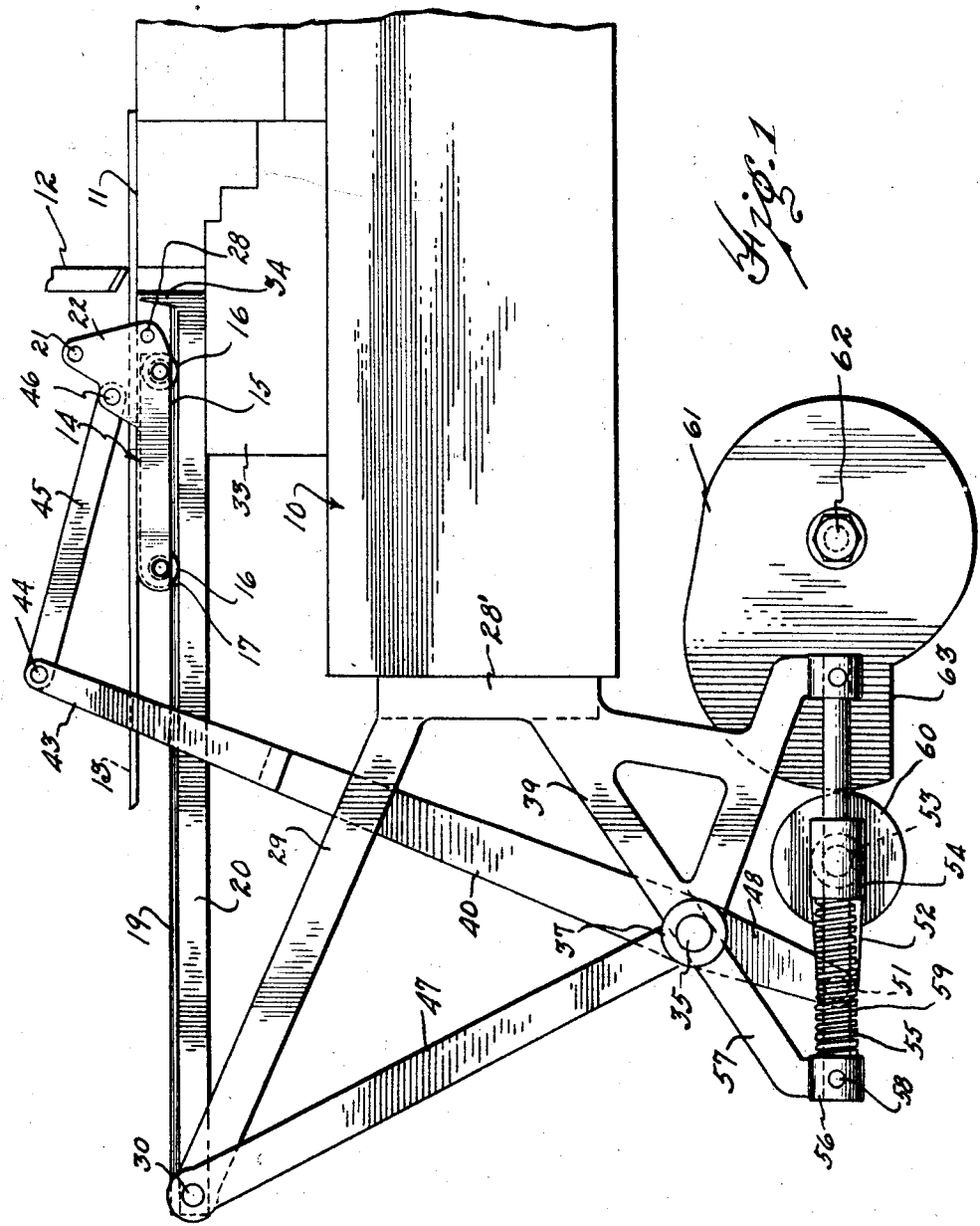
INVENTOR.
Thomas F. Rainsford
BY
ATTORNEY.

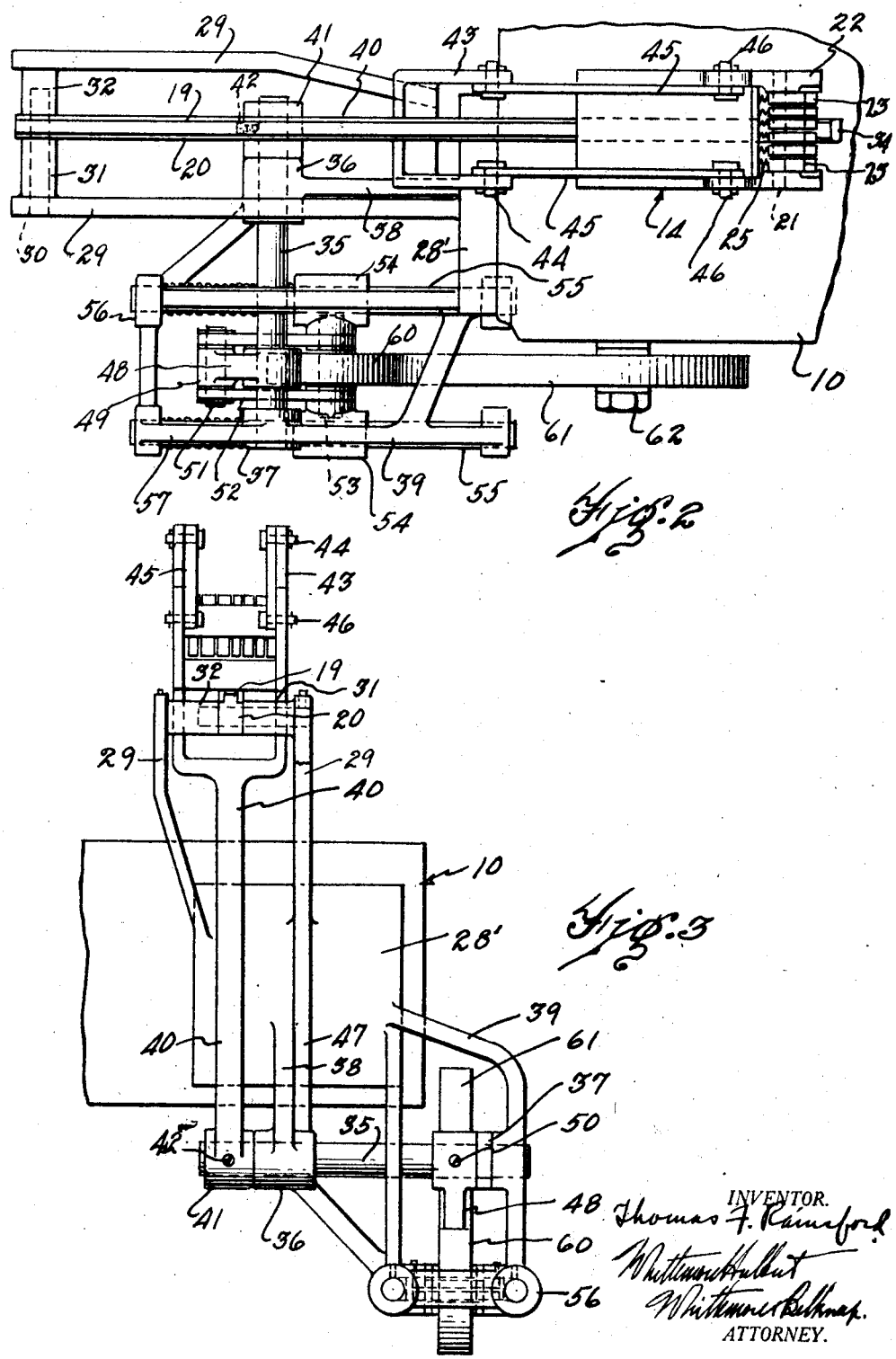

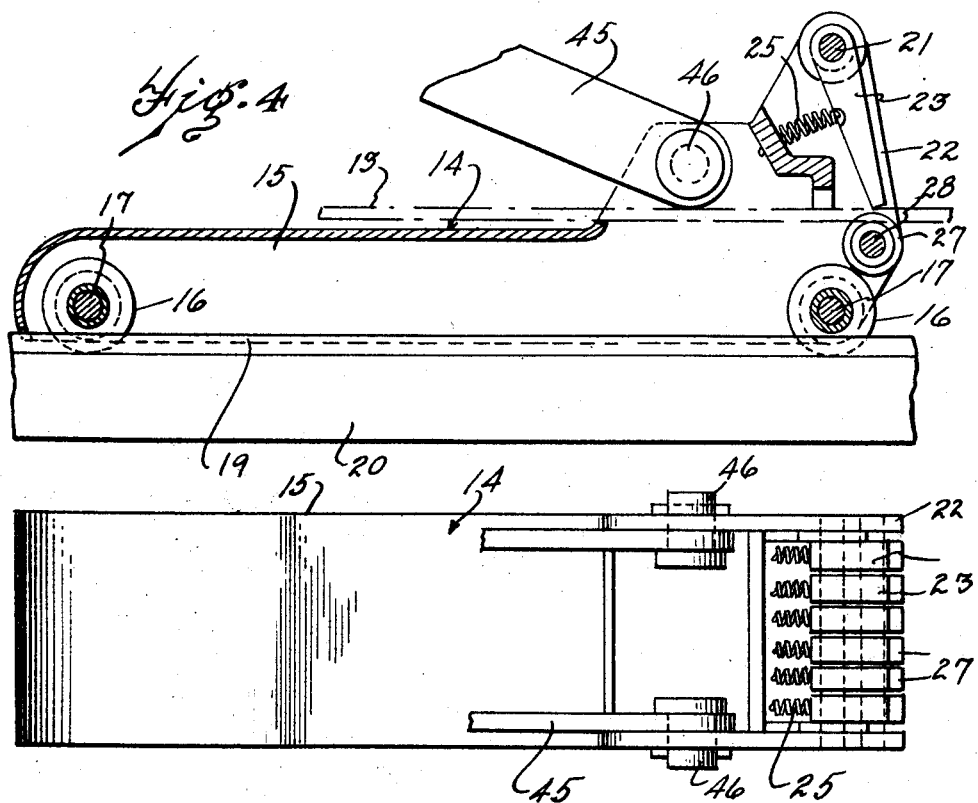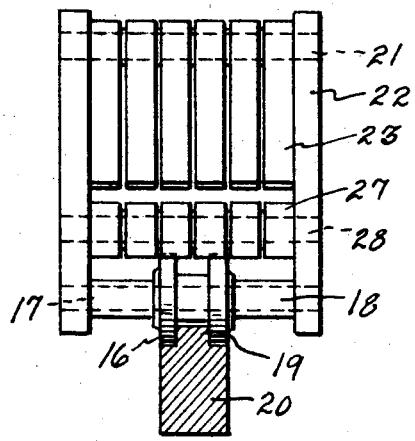

Patented Dec. 4, 1928.

1,693,728

UNITED STATES PATENT OFFICE.

THOMAS F. RAINSFORD, OF DETROIT, MICHIGAN, ASSIGNOR TO WHITEHEAD AND KALES, INC., OF RIVER ROUGE, MICHIGAN, A CORPORATION OF MICHIGAN.

MATERIAL-FEEDING DEVICE.

Application filed June 22, 1925. Serial No. 38,949.

The invention relates to material feeding devices but has particular reference to spoke feeding apparatus for use in connection with spoke forming machines.

An object of the invention is to provide an apparatus which will intermittently feed a continuous length of material to a device, such for instance as a shearing punch, whereby the material may be severed into lengths suitable for forming spokes and the like. As will become more readily apparent hereafter, however, the material feeding apparatus herein described is capable of many other adaptations and uses than the specific one herein referred to.

The invention has as other objects, to simplify, render more efficient, and improve generally devices of this character, and these, as well as additional objects, advantages, and novel features of construction will be made more apparent as this description proceeds, especially when considered in connection with the accompanying drawings wherein Figure 1 is a fragmentary side elevation of a shearing punch with my invention attached thereto, Figure 2 is a top plan view of the structure illustrated in Figure 1, Figure 3 is an end elevation of the feeding mechanism, Figure 4 is an enlarged longitudinal sectional view of the reciprocating carriage of the feeding device, Figure 5 is a top plan view of the structure illustrated in Figure 4, and Figure 6 is an end elevation of the structure illustrated in Figure 4.

Referring now particularly to the drawings wherein like reference characters indicate like parts, it will be noted that the reference character 10 indicates generally the base or bed plate of a material severing or cutting device such as a shearing punch, and is provided with a die 11 and a shearing punch 12, the latter part being reciprocable by any suitable mechanism for severing a strip of material 13, which has been fed forward by mechanism yet to be described, into suitable lengths in the formation of spokes. Obviously any suitable or desired type of material severing apparatus may be employed as well as any other type of apparatus designed to successively form or fashion the advanced work-piece or strip 13. The essential function of this invention, however, is to successively feed the strip of material 13 or other work-piece to the severing or forming machine or other apparatus.

In carrying out my invention I provide a reciprocating carriage or car 14 which comprises a pair of spaced vertical side members 15 extending longitudinally of the carriage and between which the work-piece or strip of stock 13 is adapted to travel. The carriage is supported by pairs of spaced rollers 16 arranged adjacent the front and rear thereof and suitably supported upon transversely arranged axles 17 upon which may also be mounted spacing sleeves 18 for properly spacing rollers 16 for engagement with the trackways 19 of a track bar 20.

Pivoted upon a transversely arranged rod or bar 21 mounted in forwardly arranged upwardly extending projecting portions 22 of the side plates 15 of the frame, are a plurality of gripping fingers or dogs 23. The fingers or dogs 23 are such a length as to assume the inclined position shown in Figure 4 when the lower ends thereof 24 engage the stock strip 13, the gripping fingers being normally urged rearwardly or into engagement with the stock strip by means of coil springs 25 connected thereto and to a transversely arranged angular bar 26 carried by the carriage frame.

The stock strip rests upon a plurality of rollers 27 mounted upon a shaft 28 arranged transversely of the carriage frame, these rollers preferably corresponding in number to the gripping fingers 23. The active direction of travel of carriage 14 is indicated by the arrow A in Figure 4, and from the structure thus far described it will be readily apparent that during this movement of carriage 14 the stock strip 13 will be gripped between the fingers 23 and rollers 27 and carried forward with the carriage 14, but that upon the reverse movement of this carriage fingers 23 will slip idly over the stock strip 13 without moving the same. Therefore, during a reciprocation of the carriage the stock strip 13 will be successively moved forward a predetermined distance depending upon the distance the carriage 14 has been moved.

Mounted preferably upon the base or bed plate 10 of the shearing punch is a bracket plate 28' which is provided with a pair of upwardly extending inclined arms 29, the adjacent upper ends of which are secured together by bolt 30 which extends inwardly through a sleeve-like boss 31 carried by one of the arms 29 and into a sleeve-like boss 32 carried by the other arm, the bolt also passing through the end of track bar 20 before referred to. Thus the outer end of track bar 20 is supported in the proper horizontal position, the other end of this track bar preferably resting upon and being secured to a portion 33 projecting upwardly from the base or bed plate 10 of the shearing punch. The track bar is provided with an upstanding end portion 34 to limit the movement of carriage 14 in one direction.

A rock shaft 35 is mounted in spaced bearings 36 and 37 carried respectively by arms 38 and 39 projecting in a downward direction from the lower portion of bracket plate 28'. This shaft 35 which is rocked by a mechanism yet to be described, has fixed thereto for rotation therewith a lever 40 sleeved as at 41 and fixed to the shaft 35 as, for instance, by means of a set screw 42. The upper end of the lever 40 is bifurcated to form a pair of spaced fork portions 43, which in turn are pivotally connected as at 44 to a pair of links 45 pivotally connected as at 46 to the frame of carriage 14. Consequently upon a rocking of shaft 35 lever 40 will be rocked through the connections just described and will reciprocate carriage 14 along the trackways on track bar 20. The bifurcated portions 43 of lever 40 permit an uninterrupted passage of stock strip 13 therebetween.

A brace or link 47 extends from bearing sleeve 36 to the supporting connection for the end of track bar 20, whereby an angular bracing effect for the parts is obtained.

Fixed to the other end of rock shaft 35 is a short lever 48 sleeved as at 49 and fixed to shaft 35 by suitable means such for instance as set screw 50. The lower end of lever 48 is pivoted by a pin 51 to a pair of links 52, which in turn are pivotally connected to a reciprocable yoke-like member which comprises a shaft 53 to the ends of which are secured sleeve bearings 54 reciprocably mounted upon a pair of guide rods 55 carried in bearing supports 56 mounted on arms 57 carried either directly or indirectly by bracket plate 28'. Guide rods 55 are fixed in bearing supports 56 by means of pins 58 or the like, and surrounding these guide rods are coil springs 59 which engage bearing supports 56 at one end and sleeves 54 at the other, thus normally urging the reciprocable yoke-like member to the right into the position shown in Figure 1. Mounted upon shaft 53 is a roller 60 which is adapted to be engaged by a cam member 61 rotatable about a shaft 62. The cam 61 may be rotated by any suitable means but preferably by or in synchronism with the power mechanism for operating the shearing punch.

Obviously upon rotation of cam member 61 the yoke member will be moved along guide rods 56 against the action of springs 59 by the engagement of this cam member with roller 60. Inasmuch as the yoke member is connected to lever 48 shaft 35 will be rocked and in consequence thereof lever 40 will be rocked and through the connections between this lever and carriage 14 the latter will be moved along track bar 20. When roller 60 arrives at the abrupt face 63 of the cam member it will be abruptly returned by the springs 59 to its original starting position and carriage 14 will be returned in a like manner to its extreme lefthand position.

In practice the gripping fingers 23 of carriage 14 engage the stock strip 13 only during the movement of the carriage toward the right thereby advancing or feeding the stock strip toward the severing punch a distance equal to the distance traveled by carriage 14. During the return or idle movement of the carriage 14 the fingers 23 will slide over the stock strip 13, this movement being against the action of springs 25. As mentioned, the action of cam 61 on the mechanism for rocking lever 40 is such as to advance the carriage at a relatively steady speed, while the retraction of the carriage occurs abruptly, this latter operation being controlled by the abrupt face 63 of the cam member and the action of springs 59. It will furthermore be apparent that by providing a plurality of fingers 23 stock strips of various widths may be fed with equal facility and furthermore, owing to the fact that each of the fingers 23 is normally urged into operative position by the springs 25, stock strips of various or uneven thicknesses may likewise be handled with facility.

While one embodiment of the invention as well as its application to one form of apparatus has been described and illustrated herein somewhat in detail, it will be readily apparent to those skilled in this art that various changes and modifications in the details of construction, as well as association, may be resorted to without departing from the spirit and scope of the invention, and to this end reservation is made to make such changes as may come within the purview of the accompanying claims.

What I claim as my invention is:

1. In a material feeding apparatus, a reciprocable carriage, a plurality of transversely arranged fingers carried by said carriage for frictionally engaging the material to be fed, and a plurality of rollers carried by said carriage and engaging the bottom surface of the material, said rollers corresponding in number to the fingers aforesaid.

2. In a material feeding apparatus, a reciprocable carriage, a shaft carried by and extending transversely of said carriage, means upon said shaft adapted to engage one side of the material to be fed, and a plurality of transversely arranged fingers also carried by said carriage and engageable with the opposite side of the material to grip the same between the said fingers and means aforesaid.

3. In a material feeding apparatus, a reciprocable carriage, revoluble means carried by and extending transversely of said carriage adapted to engage one side of the material to be fed and a plurality of transversely arranged fingers also carried by the carriage and engageable with the opposite side of the material to grip the same between the said fingers and revoluble means.

4. In a material feeding apparatus, a reciprocable carriage, a shaft carried by and extending transversely of said carriage, a member rotatably mounted upon the said shaft and engageable with one side of the material to be fed, and a series of transversely arranged fingers mounted upon an extension of said carriage and engageable with the opposite side of the material to grip the same between the fingers and the member aforesaid.

5. In a material feeding apparatus, a reciprocable carriage, a shaft journaled in and extending transversely of said carriage substantially below the plane of travel of the material to be fed, means upon the said shaft engageable with the bottom surface of the material, and means carried by the carriage above the plane of travel of the material and engageable with the top surface of the latter to normally urge the same into engagement with said first mentioned means.

6. In a material feeding apparatus, a reciprocable carriage, a shaft journaled in and extending transversely of said carriage substantially below the plane of travel of the material to be fed, a series of rollers carried by said shaft and engageable with the bottom surface of the material, and a plurality of transversely arranged fingers mounted upon said carriage above the plane of travel of the material and engageable with the top surface of the latter to urge the same into engagement with the said rollers.

In testimony whereof I affix my signature.

THOMAS F. RAINSFORD.